April 6, 1937. J. F. WIGGIN 2,076,419
STEREOSCOPIC OR DEPTH LENS FOR CAMERAS
Filed March 20, 1935 2 Sheets-Sheet 1

WITNESSES
Edw. Thorpe
A. L. Kitchin

INVENTOR
John Frank Wiggin
BY
Munn, Anderson & Liddy
ATTORNEY

April 6, 1937.   J. F. WIGGIN   2,076,419
STEREOSCOPIC OR DEPTH LENS FOR CAMERAS
Filed March 20, 1935   2 Sheets-Sheet 2

WITNESSES
Edw. Thorpe
A. L. Kitchin

INVENTOR
John Frank Wiggin
BY
Munn, Anderson & Liddy
ATTORNEYS

Patented Apr. 6, 1937

2,076,419

UNITED STATES PATENT OFFICE 2,076,419

STEREOSCOPIC OR DEPTH LENS FOR CAMERAS

John Frank Wiggin, Brooklyn, N. Y., assignor, by mesne assignments, to Camerascopic Lens Inc., Portland, Maine, a corporation of Maine Application March 20, 1935, Serial No. 12,085

3 Claims. (Cl. 95—18)

This invention relates to lenses and particularly to a stereoscopic or depth lens for cameras either of the moving picture kind or the still kind, an object being to provide a construction which will automatically and simultaneously superimpose images on the same film at the same time.

Another object of the invention is to provide a lens structure for a camera wherein two independent lens formations are provided and spaced apart but focused on a given surface, both lens structures being focused on the same surface whereby when the camera structure is caused to function the image of an object or series of objects from each lens structure will be focused on the film.

An additional object is to provide a depth lens structure for cameras wherein two or more lens structures are arranged to be focused on a given surface, each lens structure being provided with a cap having a comparatively small central aperture arranged on the focal axis of the lens structure whereby a great depth may be secured at all times.

In the accompanying drawings—

Figure 1:
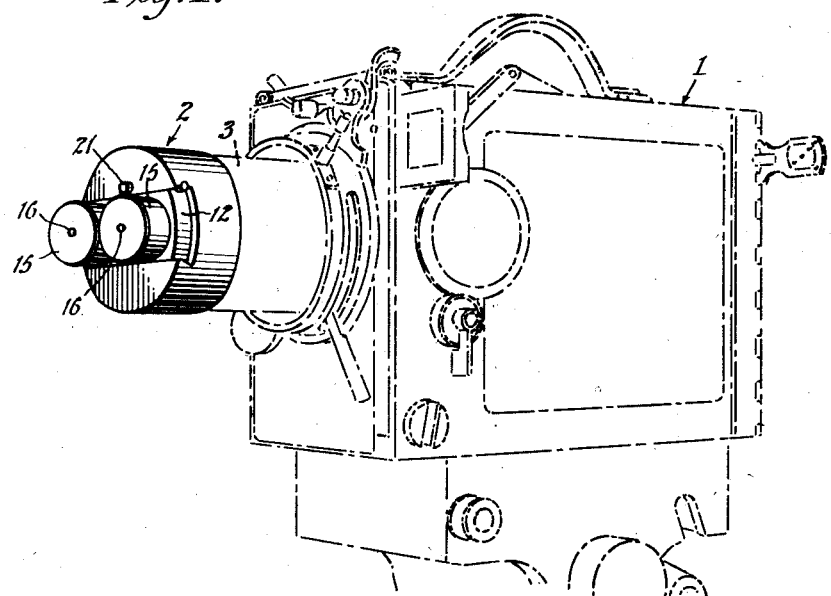
Figure 1 is a perspective view of a lens structure disclosing an embodiment of the invention, the same being shown on a moving picture camera which is illustrated in dot-and-dash lines.
Figure 2:
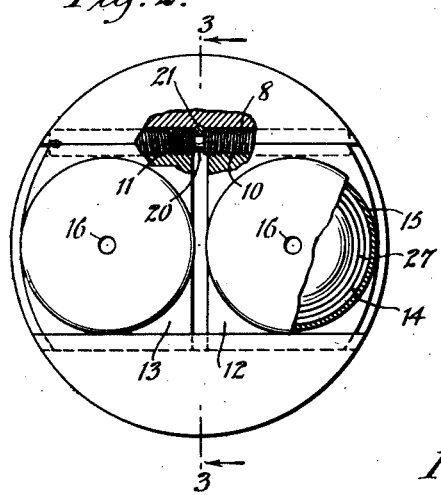
Fig. 2 is a front view on an enlarged scale of the lens structure shown in Fig. 1, certain parts being broken away to better illustrate the detail structure.
Figure 3:
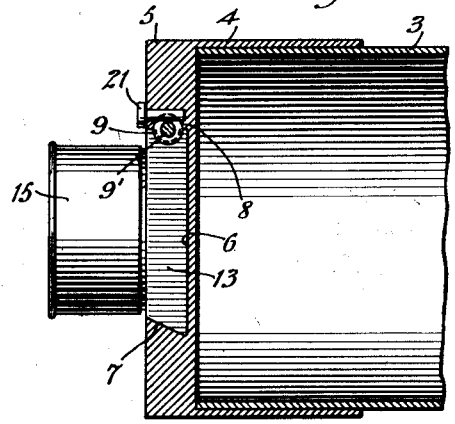
Fig. 3 is a sectional view through Fig. 2 approximately on the line 3—3.
Figure 4:
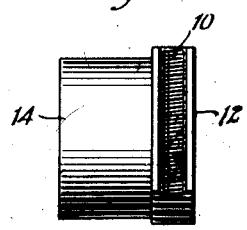
Fig. 4 is a side view of one of the lens structures shown in Fig. 2.

Referring to the accompanying drawings by numerals, 1 indicates a moving picture camera, and 2 the lens formation embodying the invention. This lens formation as a whole might be applied to the particular camera shown in Fig. 1, or to other forms of moving picture cameras, or still cameras, without departing from the spirit of the invention. As shown in Figs. 2 and 3, there is provided a tubular support 3, which is adapted to be connected to the camera in any desired manner, and over this support is fitted a telescopic sleeve 4 having a comparatively thick end 5. The end 5 is provided with a slideway 6 having a beveled portion 7 and a groove 8. The groove 8 accommodates a part of the adjusting screw 9, said adjusting screw having right and left hand threads meshing continually with threads 10 and 11 of base plates 12 and 13. These base plates carry tubular members 14 and these tubular members in turn carry caps 15, said caps being either slidably or otherwise mounted and provided with a central aperture 16, the center of which is in the focal axes of the various lenses 17 and 18.

Figure 5:
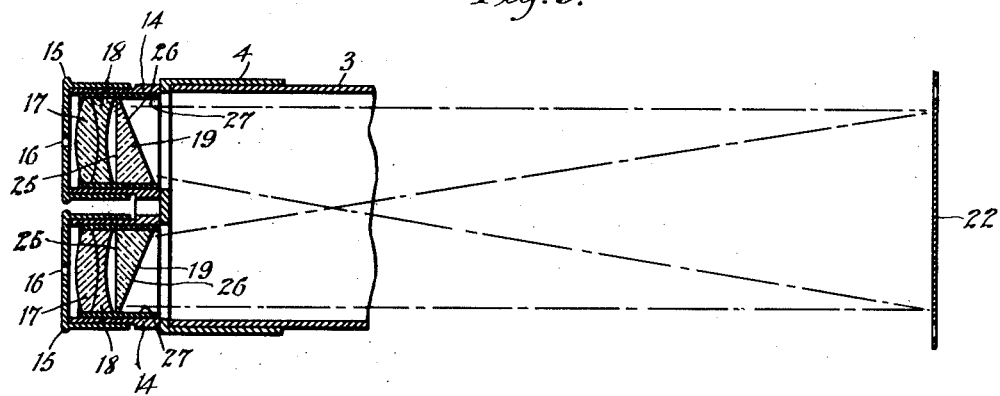
Fig. 5 is a view partly in section and partly in diagram illustrating the details of the structure shown in Fig. 1, and also illustrating how the focuses of the respective images are on the same surface and of the same size.

It will be understood that each of the tubular members 14 is provided with a set of lenses and also a prism 19 as shown in Fig. 5. However, as illustrated in Figs. 1 to 3, the tubular members 14 and the parts carried thereby may be adjusted toward and from each other by rotation of the screw 9'. This screw has a reduced portion 20 for accommodating a pin 21, whereby the screw may be freely rotated but will not move longitudinally, though the bases 12 and 13 will move toward and from each other simultaneously. While this adjustable feature is desirable for certain purposes, it will be understood that in many cameras this adjustable feature will be omitted, and the various lenses and the caps with the opening 16 will be fixed and, consequently, the focus will be fixed. By reason of the small opening 16 great depth to all pictures is secured, the various lenses being sufficiently rapid to secure the desired result. It will be understood that the usual shutters and other parts of the camera are used to secure the desired exposure of the film or plate carried by the camera.

In Fig. 5 the diagram will illustrate more exactly how the parts function. It will be observed that there are two sets of lenses and two sets of prisms arranged in certain order whereby the images going through the respective openings 16 will be focused on the plate or surface 22 and be exactly superimposed. In this way a stereoscopic or great depth picture may be secured.

Figure 6:
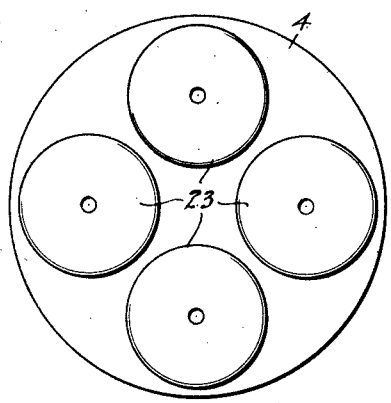
Fig. 6 is a front view similar to Fig. 2 but showing a slightly modified structure.
Figure 7:
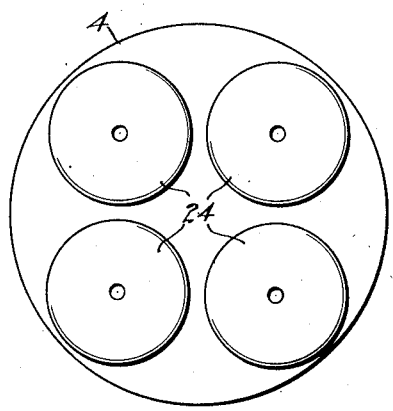
Fig. 7 is a view similar to Fig. 6 but showing a further modified structure.

While two groups of lens structures are desirable as shown in Figs. 1 and 5, it is evident that more could be provided if desired, as, for instance, in Fig. 6 there are four groups 23, two lenses being arranged in the same horizontal plane and two in the same vertical plane. In Fig. 7 four groups of lenses 24 are provided, the respective positions of the groups being in two horizontal and two vertical planes. Other groupings could be provided without departing from the spirit of the invention, but when provided all lenses must focus on the same surface, as, for instance, surface 22.

In most moving picture cameras, as well as still cameras, the parts will be manufactured at the factory so as to be non-adjustable, whereby the focus will always be accurate as it will be accurately ascertained at the factory before the camera leaves the factory. If desired, the caps 15 could be removed and others substituted having larger or smaller apertures 16, but the position and arrangement of the groups of lenses and prisms would always remain the same because this is necessary in order that the focus on the plate or surface 22 shall always be accurate. Great accuracy in this respect is desirable as the light rays producing the image on the plate or surface 22 must exactly place the respective images one on top of the other so that the respective images from each group of lenses will merge into the other images and form a single image on the plate, film, or other surface 22.

It will be understood that when a camera is fitted with a depth lens as shown in Fig. 5, it will be necessary to provide an exposure and then develop the plate or film in the usual manner and a negative having a great depth and great definition will be secured; also as the images as produced by the respective groups of lenses are taken from slightly spaced points, a stereoscopic effect will be produced which will give a round or third dimension effect to all the objects photographed.

In regard to the prisms 19, preferably all the surfaces thereof are hooded in some manner, as, for instance, by being covered with black opaque paint except the surfaces 25 and 26. This prevents or reduces to a minimum the dividing of the light rays into their prismatic colors without in any way preventing the deflecting of the rays as illustrated in Fig. 5.

As indicated particularly in Fig. 5, it will be seen that the respective lenses 17 and 18 and the respective prisms 19 are mounted in the respective sliding tubular members 27, which in turn are carried by tubular extensions 28 of the member 24, the parts being so proportioned that some appreciable friction is present so that the tubular supports or carriers 27 will remain in any position to which they have been moved. In many cases the parts are so arranged that both sets of lenses will be focused exactly on the member 22, but sometimes it might be desirable to move one set of lenses and prism slightly further away from the member 22 than the other so as to get a greater shadow or a stereoscopic effect. By this arrangement either group of lenses may be adjusted toward or from a given object and also either group may be moved toward or from each other. By proper setting of the slides 12 and 13, the respective lenses may cause the picture on the member 22 to be slightly offset or slightly off register.

I claim:

1. A stereoscopic lens structure, comprising a pair of lens cases, screw means for adjusting said lens cases toward and from each other, a focusing lens carried by each of said cases, means for deflecting the light rays passing through said lenses so as to position the image carried thereby in superimposed relationship on a surface, and a light stop for each lens movable over said cases toward and from said lenses, each of said stops having an aperture many times smaller than the diameter of said lenses, the respective apertures being in axial alignment with the focal axes of the respective lenses.

2. A device of the character described, comprising a plurality of groups of lenses, each group comprising a double convex lens, a double concave lens, said lenses being positioned so that the focal axes thereof will be in exact alignment, a prism for each group of lenses, each of said prisms having three flat surfaces, two of said surfaces being at right angles to each other, with one of the right-angle surfaces positioned normal to the focal axis of said lenses and with its center in line with the focal axes of said lenses, said groups being focused on a given surface and said prisms acting to shift the rays of light so that the images from the respective groups will be superimposed in exact alignment on said surface, a casing carrying each of said groups of lenses and its corresponding prism and screw means for moving said casings toward and from each other.

3. A device of the character described, comprising a sleeve having a thickened end formed with a pair of apertures, a slideway and a groove facing said slideway, a pair of apertured slides mounted in said slideway, each of said slides having in one edge a threaded groove, the threads of said slides being respectively right and left threads extending from the respective ends of the slides to the center thereof, a right and left screw engaging the threads in said slides, whereby when the screw is rotated said slides will move toward or from each other, means for preventing the longitudinal movement of said screw without interfering with its rotary movement, a tubular member carried by each of said slides, a prism and a group of focusing lenses carried by each of said slides, and a light stop telescopically fitting over each of said tubular members and movable over said tubular members toward and from said lenses, each of said stops having an aperture appreciably smaller than the diameter of said lenses, the respective apertures in said stops being in axial alignment with the focal axes of the respective lenses.

JOHN FRANK WIGGIN.